F. D. GREEN.
Machines for Relishing Doors, &c.

No. 136,505. Patented March 4, 1873.

Witness:
Franck L. Durand
C. L. Evert

Inventor.
Francis D. Green,
per
Alexander Mason
Attorneys.

UNITED STATES PATENT OFFICE.

FRANCIS D. GREEN, OF WILLIAMSPORT, PENNSYLVANIA.

IMPROVEMENT IN MACHINES FOR RELISHING DOORS, &c.

Specification forming part of Letters Patent No. 136,505, dated March 4, 1873.

*To all whom it may concern:*

Be it known that I, FRANCIS D. GREEN, of Williamsport, in the county of Lycoming and in the State of Pennsylvania, have invented certain new and useful Improvements in Machines for Relishing Doors, Sash, Blinds, &c.; and do hereby declare that the following is a full, clear, and exact description thereof, reference being had to the accompanying drawing and to the letters of reference marked thereon making a part of this specification.

The nature of my invention consists in the construction and arrangement of a machine for relishing doors, sash, blinds, &c., as will be hereinafter more fully set forth.

In order to enable others skilled in the art to which my invention appertains to make and use the same, I will now proceed to describe its construction and operation, referring to the annexed drawing, in which—

Figure 1:
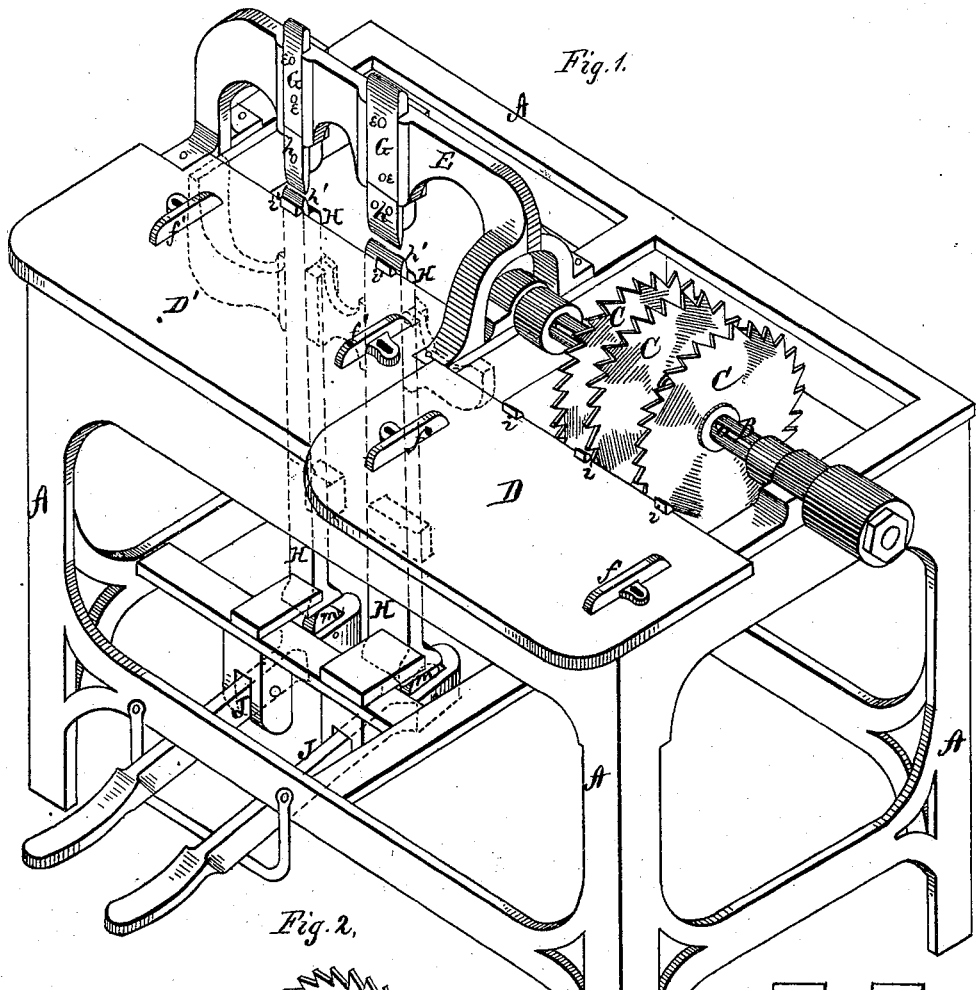
Figure 2:
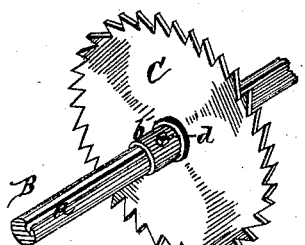

Figure 1 is a perspective view of my entire machine; and Fig. 2 represents a part of the saw-arbor, with one of the saws on the same.

A represents the frame-work of my machine, constructed in any suitable manner to contain the various working parts. B represents the saw-arbor, located and revolving in suitable journal-boxes on the frame A, and carrying saws C C. The arbor B is provided with a longitudinal groove, $a$, and the hub of each saw C has a collar or sleeve, $b$, extending on one side, which collar or sleeve has a feather to fit in the groove $a$, and thus carry the saw around when the arbor revolves. The collar or sleeve $b$ is provided with a set-screw, $d$, to fasten the saw at any desired point on the arbor. By this means the saws can be set on the arbor at any desired distances apart, to cut the tenons formed on door-rails and similar work.

Door, sash, and blind rails, and such work, are first formed with a tenon at each end, extending the entire width of the rail, which tenon is to be cut out into two or more smaller ones to fit in the mortises made in the adjoining rails, and the saws C C rip the tenon from the outer edge inward for this purpose.

In front of the saws C C is a table, D, upon which the rail is to be held and moved inward for the saws to operate. On each side of the table D is an adjustable gage, $f$, against which the rail is to be held; and at the front edge of the table are stops $i\ i$, so that the rail can only be moved inwardly the proper distance, or until the shoulder at the base of the tenon comes against said stops, when the tenon has been ripped as far as necessary.

Parts of the tenon thus ripped by the saws C C are now to be cut off, which completes what is called the "relishing" of the rails; and this I accomplish by the following means: Over a part of the frame A is arranged a bridge, E, in which are secured chisel-holders G G by means of bolts $e\ e$, and each holder or bar G has attached to it a chisel-blade, $h$.

The chisel holders or bars G G are adjustable up and down so as to accommodate the chisels to the thickness of the tenon to be cut. Below each chisel $h$ is another chisel-blade, $h'$, attached to a bar, H, which moves perpendicularly up and down in suitable guides on the frame A. The lower end of each bar H rests upon a friction-roller, $m$, in the inner or rear end of a foot-lever, J, which is pivoted in any suitable manner in the lower part of the frame A. In front of the chisels is a table, D', with adjustable gages $f'$ and stops $i'$, for the same purpose as described for the table D.

After the saws C C have ripped the tenons in the proper places, as above described, the rail is placed on the table D', against one of the gages $f'$, with the shoulder at the base of the tenon against the stops $i'$. The operator then puts his foot on the proper foot-lever J, forcing the under chisel $h'$ upward, the two chisels $h$ and $h'$ entering the tenon from opposite sides and meeting in the center, having cut off the desired part. As soon as the operator's foot is removed from the lever J a weight or spring properly applied on and attached to the bar H lowers the same, so that the edge of the chisel-blade will be below the upper edge of the table.

Having thus fully described my invention, what I claim as new, and desire to secure by Letters Patent, is—

1. The combination of the adjustable chisel-holder G, with chisel $h$ arranged upon the bridge E, and the movable chisel $h'$ on the vertical bar H, the latter operated by the foot-lever J, substantially as and for the purposes herein set forth.

2. In combination with the chisels $h\ h'$, arranged to operate as described, the table $D'$, with stops $i'$ and adjustable gages $f'$, substantially as and for the purposes herein set forth.

In testimony that I claim the foregoing I have hereunto set my hand this 6th day of February, 1873.

FRANCIS D. GREEN.

Witnesses:
C. L. EVERT,
A. N. MARR.